US012047915B2

United States Patent
Li et al.

(10) Patent No.: US 12,047,915 B2
(45) Date of Patent: *Jul. 23, 2024

(54) CONTROL CHANNEL STRUCTURE DESIGN TO SUPPORT V2X TRAFFIC

(71) Applicant: Nokia Technologies Oy, Espoo (FI)

(72) Inventors: Dong Li, Shanghai (CN); Yong Liu, Shanghai (CN); Torsten Wildschek, Gloucester (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,011

(22) Filed: Mar. 8, 2023

(65) Prior Publication Data

US 2023/0224868 A1 Jul. 13, 2023

Related U.S. Application Data

(63) Continuation of application No. 17/343,162, filed on Jun. 9, 2021, now Pat. No. 11,638,236, which is a continuation of application No. 16/967,206, filed as application No. PCT/CN2018/108481 on Sep. 28, 2018, now Pat. No. 11,064,461.

(51) Int. Cl.
*H04W 72/02* (2009.01)
*H04L 1/00* (2006.01)
(Continued)

(52) U.S. Cl.
CPC .......... *H04W 72/02* (2013.01); *H04L 1/0004* (2013.01); *H04W 4/40* (2018.02); *H04W 28/26* (2013.01);
(Continued)

(58) Field of Classification Search
CPC ....... H04W 72/02; H04W 4/40; H04W 28/26; H04W 72/0406; H04W 72/0446;
(Continued)

(56) References Cited

U.S. PATENT DOCUMENTS

| 9,974,077 B2 | 5/2018 | Sartori et al. |
| 2010/0002699 A1 | 1/2010 | Carpio et al. |

(Continued)

FOREIGN PATENT DOCUMENTS

| CN | 101217689 A | 7/2008 |
| CN | 107027105 A | 8/2017 |

(Continued)

OTHER PUBLICATIONS

"Revised WID on 5G V2X with NR Sidelink", RP-191723, 3GPP TSG RAN Meeting #85, LG Electronics (Sep. 2019), 8 pages.
(Continued)

*Primary Examiner* — Shukri Taha
(74) *Attorney, Agent, or Firm* — ALSTON & BIRD LLP

(57) ABSTRACT

There is provided an apparatus, said apparatus comprising means for providing first control information using a first control channel and at least second control information using a second control channel, wherein the first control information comprises at least an indication of resource reservation for an associated data channel and the second control information comprises at least transmission format information for the associated data channel, wherein the associated data channel comprises periodic or aperiodic data traffic.

26 Claims, 10 Drawing Sheets

(51) Int. Cl.
| | |
|---|---|
| *H04W 4/40* | (2018.01) |
| *H04W 28/26* | (2009.01) |
| *H04W 72/0446* | (2023.01) |
| *H04W 72/0453* | (2023.01) |
| *H04W 72/20* | (2023.01) |
| *H04W 92/18* | (2009.01) |

(52) U.S. Cl.
CPC ... *H04W 72/0446* (2013.01); *H04W 72/0453* (2013.01); *H04W 72/20* (2023.01); *H04W 92/18* (2013.01)

(58) Field of Classification Search
CPC . H04W 72/0453; H04W 92/18; H04W 76/14; H04W 24/10; H04L 1/004
See application file for complete search history.

(56) References Cited

U.S. PATENT DOCUMENTS

| | | | |
|---|---|---|---|
| 2013/0029675 A1* | 1/2013 | Kwon | H04W 76/14 455/450 |
| 2015/0296405 A1 | 10/2015 | Kim et al. | |
| 2016/0073408 A1 | 3/2016 | Sartori et al. | |
| 2016/0219620 A1 | 7/2016 | Lee et al. | |
| 2016/0295624 A1 | 10/2016 | Novlan et al. | |
| 2017/0048905 A1 | 2/2017 | Yun et al. | |
| 2017/0055280 A1 | 2/2017 | Kim et al. | |
| 2017/0181011 A1 | 6/2017 | Yu et al. | |
| 2017/0331670 A1* | 11/2017 | Parkvall | H04W 24/10 |
| 2018/0116007 A1 | 4/2018 | Yasukawa et al. | |
| 2018/0176892 A1 | 6/2018 | Kim et al. | |
| 2018/0213438 A1 | 7/2018 | Muraoka et al. | |
| 2018/0234220 A1 | 8/2018 | Yasukawa et al. | |
| 2018/0234888 A1 | 8/2018 | Yasukawa et al. | |
| 2018/0234973 A1 | 8/2018 | Lee et al. | |
| 2018/0317221 A1 | 11/2018 | Yasukawa et al. | |
| 2019/0021019 A1 | 1/2019 | Seo et al. | |
| 2019/0306835 A1 | 10/2019 | Hoang et al. | |
| 2019/0306912 A1 | 10/2019 | Cheng et al. | |
| 2019/0356451 A1 | 11/2019 | Zhang et al. | |
| 2020/0015272 A1 | 1/2020 | Lee et al. | |
| 2020/0214002 A1 | 7/2020 | Lee et al. | |
| 2020/0288431 A1 | 9/2020 | Lee et al. | |
| 2020/0337067 A1 | 10/2020 | Chae et al. | |
| 2023/0119853 A1* | 4/2023 | Wang | H04W 72/20 370/329 |

FOREIGN PATENT DOCUMENTS

| | | |
|---|---|---|
| CN | 107027188 A | 8/2017 |
| CN | 107277922 A | 10/2017 |
| CN | 107431950 A | 12/2017 |
| CN | 107733600 A | 2/2018 |
| CN | 107734543 A | 2/2018 |
| CN | 107889073 A | 4/2018 |
| CN | 107926005 A | 4/2018 |
| RU | 2498513 C2 | 11/2013 |
| WO | WO 2008/083580 A1 | 7/2008 |
| WO | WO 2017/010030 A1 | 1/2017 |
| WO | WO 2017/026545 A1 | 2/2017 |
| WO | WO 2017/111565 A1 | 6/2017 |
| WO | WO 2017/122949 A1 | 7/2017 |
| WO | WO 2018/095156 A1 | 5/2018 |

OTHER PUBLICATIONS

3GPP TR 37.885 V15.0.0, 3$^{rd}$ Generation Partnership Project; Technical Specification Group Radio Access Network; Study on Evaluation Methodology of New Vehicle-to-Everything V2X Use Cases for LTE and NR; (Release 15) (Jun. 2018) 36 pages.
3GPP TS 36.331 V15.2.2, 3$^{rd}$ Generation Partnership Project; Technical Specification Group Radio Access Network; Evolved Universal Terrestrial Radio Access (E-UTRA); Radio Resource Control (RRC); Protocol Specification (Release 15) (Jun. 2018) 791 pages.
3GPP TS 38.211 v 15.3.0, "3rd Generation Partnership Project; Technical Specification Group Radio Access Network; NR; Physical Channels and Modulation (Release 15)", (Sep. 2018), 96 pages.
3GPP TS 38.212 v 15.3.0, "3rd Generation Partnership Project; Technical Specification Group Radio Access Network; NR; Multiplexing and Channel Coding (Release 15)", (Sep. 2018), 99 pages.
3GPP TS 38.213 v 15.2.0, "3rd Generation Partnership Project; Technical Specification Group Radio Access Network; NR; Physical Layer Procedures for Control (Release 15)", (Jun. 2018), 99 pages.
3GPP TS 38.214 v 15.2.0, "3rd Generation Partnership Project; Technical Specification Group Radio Access Network; NR; Physical Layer Procedures for Data (Release 15)", (Jun. 2018), 95 pages.
3GPP TS 38.300 v 15.3.0, "3rd Generation Partnership Project; Technical Specification Group Radio Access Network; NR; NR and NG-RAN Overall Description; Stage 2 (Release 15)", (Sep. 2018), 92 pages.
Decision to Grant for Chinese Application No. 201880090617.3 dated Jul. 4, 2022, 8 pages.
Decision to Grant for Japanese Application No. 2021-516809 dated Feb. 15, 2023, 4 pages.
Decision to Grant for Russian Application No. 2021107950 dated Feb. 8, 2022, 34 pages.
ETSI TS 136 321 V14.6.0, LTE; Evolved Universal Terrestrial Radio Access (E-UTRA); Medium Access Control (MAC) Protocol Specification, Release 14 (Apr. 2018) 111 pages.
Extended European Search Report for European Patent Application No. 18935023.4, dated Dec. 3, 2020, 7 pages.
Final Office Action for U.S. Appl. No. 16/967,206, dated Nov. 23, 2020, 12 pages.
Final Report of 3GPP TSG RAN WG1 Meeting #94 v1.0.0, R1-1810051, Oct. 2018 (Gothenburg, Sweden, Aug. 2018), 194 pages.
First Examination Report for Indian Application No. 202127018197 dated Jul. 25, 2022, 6 pages.
International Search Report and Written Opinion for Application No. PCT/CN2018/108481 dated Feb. 27, 2019, 6 pages.
Non-Final Office Action for U.S. Appl. No. 17/343,162 dated Jun. 7, 2022.
Notice of Acceptance for Australian Application No. 2018443844 dated May 16, 2022, 3 pages.
Notice of Acceptance for Chilean Application No. 2021-000641 dated Nov. 15, 2022, 2 pages.
Notice of Allowance for ARIPO Application No. AP/P/2021/013016 dated Oct. 14, 2022, 5 pages.
Notice of Allowance for U.S. Appl. No. 16/967,206 dated Mar. 12, 2021.
Notice of Allowance for U.S. Appl. No. 17/343,162 dated Dec. 12, 2022.
Office Action for Australian Application No. 2018443844 dated Oct. 6, 2021, 2 pages.
Office Action for Chilean Application No. 202100641 dated Apr. 12, 2022, 10 pages.
Office Action for Chinese Application No. 201880090617.3 dated Dec. 31, 2021, 12 pages.
Office Action for European Application No. 18935023.4 dated Jan. 3, 2022, 5 pages.
Office Action for Japanese Application No. 2021-516809 dated Jun. 1, 2022, 3 pages.
Office Action for Russian Application No. 2021107950 dated Sep. 23, 2021, 7 pages.
Office Action for Singapore Application No. 11202103101V dated Nov. 15, 2022, 10 pages.
Office Action for U.S. Appl. No. 16/967,206 dated Sep. 9, 2020.
Office Action for Vietnam Application No. 1-2021-01863 dated Nov. 5, 2021, 3 pages.
Notice of Allowance for U.S. Appl. No. 17/343,162 dated Mar. 2, 2023.
Office Action for Australian Application No. 2022221508 dated Jun. 9, 2023, 2 pages.

(56) References Cited

OTHER PUBLICATIONS

Office Action for Egyptian Application No. 473/2021 dated Mar. 20, 2023, 4 pages.
Office Action for Saudi Arabian Application No. 521421571 dated May 17, 2023, 8 pages.
Office Action for Singapore Application No. 11202103101V dated Jun. 19, 2023, 7 pages.
Office Action for Thailand Application No. 2101001829 dated Feb. 27, 2023, 7 pages.
Intel Corporation, "Scheduling Assignment for Sidelink V2V Communication", 3GPP TSG RAN WG1 Meeting #86, R1-166516, (Aug. 22-26, 2016), 10 pages.
Office Action for Korean Application No. 10-2021-7010644 dated Mar. 20, 2024, 12 pages.
Office Action for Saudi Arabian Application No. 521421571 dated Apr. 24, 2024, 14 pages.
OPPO, "Transmit Diversity Scheme in eV2X", 3GPP TSG RAN WG1 Meeting #90bis, R1-1718039, (Oct. 9-13, 2017), 3 pages.

\* cited by examiner

S1: Providing first control information using a first control channel, wherein the first control information comprises at least an indication of resource reservation for an associated data channel S2: Providing at least second control information using a second control channel, wherein the second control information comprises at least transmission format information for the associated data channel

FIG. 5

T1: Receiving first control information using a first control channel, wherein the first control information comprises at least an indication of resource reservation for an associated data channel T2: Receiving at least second control information using a second control channel, wherein the second control information comprises at least transmission format information for the associated data channel

FIG. 6

CONTROL CHANNEL STRUCTURE DESIGN TO SUPPORT V2X TRAFFIC

CROSS-REFERENCE TO RELATED APPLICATIONS

This application is a continuation of U.S. patent application Ser. No. 17/343,162, filed Jun. 9, 2021 and entitled "Control Channel Structure Design to Support V2X Traffic," which is a continuation of U.S. patent application Ser. No. 16/967,206, filed Aug. 4, 2020 and entitled "Control Channel Structure Design to Support V2X Traffic," which is a national phase entry of International Patent Application No. PCT/CN2018/108481, filed Sep. 28, 2018 and entitled "Control Channel Structure Design to Support V2X Traffic," the entire disclosures of each of which are hereby incorporated herein by reference in their entireties for all purposes.

FIELD

The present application relates to a method, apparatus, system and computer program and in particular but not exclusively to control channel structures for periodic and aperiodic vehicle-to-everything (V2X) traffic.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus, said apparatus comprising means for providing first control information using a first control channel and at least second control information using a second control channel, wherein the first control information comprises at least an indication of resource reservation for an associated data channel and the second control information comprises at least transmission format information for the associated data channel, wherein the associated data channel comprises periodic or aperiodic data traffic.

The apparatus may comprise means for providing the first control information and the second control information using the second control channel.

The first control information may comprise at least one of an indication of data periodicity, data packet information indicating quality of service requirement, resource reservation information and resource allocation information.

The second control information may comprise at least one of modulation and coding scheme (MCS) information, multi-antenna transmission related information and destination address information.

At least one of the first control information and the second control information may comprise at least one of data packet retransmission information and demodulation reference configuration information for the associated data channel.

The apparatus may comprise means for, when the associated data channel comprises periodic data traffic and there is no data transmission in a current period, providing first control information using the first control channel, wherein the first control information comprises an indication of the absence of data transmission in the current period.

The apparatus may comprise means for, when the associated data channel comprises periodic data traffic and there is data transmission in a current period, providing the second control channel or the first control channel and the second control channel with the associated data channel.

The apparatus may comprise means for, when the associated data channel comprises aperiodic data traffic, providing the first control channel in time resources preceding the associated data channel.

In a second aspect there is provided an apparatus, said apparatus comprising means for receiving first control information using a first control channel and at least second control information using a second control channel, wherein the first control information comprises at least an indication of resource reservation for an associated data channel and the second control information comprises at least transmission format information for the associated data channel, wherein the associated data channel comprises periodic or aperiodic data traffic.

The apparatus may comprise means for receiving the first control information and the second control information using the second control channel.

The first control information may comprise at least one of an indication of data periodicity, data packet information indicating quality of service requirement, resource reservation information and resource allocation information.

The second control information comprises at least one of modulation and coding scheme (MCS) information, multi-antenna transmission related information and destination address information.

At least one of the first control information and the second control information may comprise at least one of data packet retransmission information and demodulation reference configuration information for the associated data channel.

The apparatus may comprise means for, when the associated data channel comprises periodic data traffic and there is no data transmission in a current period, receiving first control information using the first channel, wherein the first control information comprises an indication of the absence of data transmission in the current period.

The apparatus may comprise means for, when the associated data channel comprises periodic data traffic and there is data transmission in a current period, receiving the second control channel or the first control channel and the second control channel with the associated data channel.

The apparatus may comprise means for, when the associated data channel comprises aperiodic data traffic, receiving the first control channel in time resources preceding the associated data channel.

In a third aspect there is provided a method comprising for providing first control information using a first control channel and at least second control information using a second control channel, wherein the first control information comprises at least an indication of resource reservation for an associated data channel and the second control information comprises at least transmission format information for the associated data channel, wherein the associated data channel comprises periodic or aperiodic data traffic.

The method may comprise providing the first control information and the second control information using the second control channel.

The first control information may comprise at least one of an indication of data periodicity, data packet information indicating quality of service requirement, resource reservation information and resource allocation information.

The second control information may comprise at least one of modulation and coding scheme (MCS) information, multi-antenna transmission related information and destination address information.

At least one of the first control information and the second control information may comprise at least one of data packet retransmission information and demodulation reference configuration information for the associated data channel.

The method may comprise, when the associated data channel comprises periodic data traffic and there is no data transmission in a current period, providing first control information using the first control channel, wherein the first control information comprises an indication of the absence of data transmission in the current period.

The method may comprise, when the associated data channel comprises periodic data traffic and there is data transmission in a current period, providing the second control channel or the first control channel and the second control channel with the associated data channel.

The method may comprise, when the associated data channel comprises aperiodic data traffic, providing the first control channel in time resources preceding the associated data channel.

In a fourth aspect there is provided a method comprising receiving first control information using a first control channel and at least second control information using a second control channel, wherein the first control information comprises at least an indication of resource reservation for an associated data channel and the second control information comprises at least transmission format information for the associated data channel, wherein the associated data channel comprises periodic or aperiodic data traffic.

The method may comprise receiving the first control information and the second control information using the second control channel.

The first control information may comprise at least one of an indication of data periodicity, data packet information indicating quality of service requirement, resource reservation information and resource allocation information.

The second control information comprises at least one of modulation and coding scheme (MCS) information, multi-antenna transmission related information and destination address information.

At least one of the first control information and the second control information may comprise at least one of data packet retransmission information and demodulation reference configuration information for the associated data channel.

The method may comprise, when the associated data channel comprises periodic data traffic and there is no data transmission in a current period, receiving first control information using the first channel, wherein the first control information comprises an indication of the absence of data transmission in the current period.

The method may comprise, when the associated data channel comprises periodic data traffic and there is data transmission in a current period, receiving the second control channel or the first control channel and the second control channel with the associated data channel.

The method may comprise, when the associated data channel comprises aperiodic data traffic, receiving the first control channel in time resources preceding the associated data channel.

In a fifth aspect there is provided an apparatus comprising: at least one processor and at least one memory including a computer program code, the at least one memory and computer program code configured to, with the at least one processor, cause the apparatus at least to: provide first control information using a first control channel and at least second control information using a second control channel, wherein the first control information comprises at least an indication of resource reservation for an associated data channel and the second control information comprises at least transmission format information for the associated data channel, wherein the associated data channel comprises periodic or aperiodic data traffic.

The apparatus may be configured to provide the first control information and the second control information using the second control channel.

The first control information may comprise at least one of an indication of data periodicity, data packet information indicating quality of service requirement, resource reservation information and resource allocation information.

The second control information may comprise at least one of modulation and coding scheme (MCS) information, multi-antenna transmission related information and destination address information.

At least one of the first control information and the second control information may comprise at least one of data packet retransmission information and demodulation reference configuration information for the associated data channel.

The apparatus may be configured to, when the associated data channel comprises periodic data traffic and there is no data transmission in a current period, provide first control information using the first control channel, wherein the first control information comprises an indication of the absence of data transmission in the current period.

The apparatus may be configured to, when the associated data channel comprises periodic data traffic and there is data transmission in a current period, provide the second control channel or the first control channel and the second control channel with the associated data channel.

The apparatus may be configured to, when the associated data channel comprises aperiodic data traffic, providing the first control channel in time resources preceding the associated data channel.

In a sixth aspect there is provided an apparatus comprising: at least one processor and at least one memory including a computer program code, the at least one memory and computer program code configured to, with the at least one processor, cause the apparatus at least to: receive first control information using a first control channel and at least second control information using a second control channel, wherein the first control information comprises at least an indication of resource reservation for an associated data channel and the second control information comprises at least transmission format information for the associated data channel, wherein the associated data channel comprises periodic or aperiodic data traffic.

The apparatus may be configured to receive the first control information and the second control information using the second control channel.

The first control information may comprise at least one of an indication of data periodicity, data packet information indicating quality of service requirement, resource reservation information and resource allocation information.

The second control information comprises at least one of modulation and coding scheme (MCS) information, multi-antenna transmission related information and destination address information.

At least one of the first control information and the second control information may comprise at least one of data packet retransmission information and demodulation reference configuration information for the associated data channel.

The apparatus may be configured to, when the associated data channel comprises periodic data traffic and there is no data transmission in a current period, receive first control information using the first channel, wherein the first control information comprises an indication of the absence of data transmission in the current period.

The apparatus may be configured to, when the associated data channel comprises periodic data traffic and there is data transmission in a current period, receive the second control channel or the first control channel and the second control channel with the associated data channel.

The apparatus may be configured to, when the associated data channel comprises aperiodic data traffic, receive the first control channel in time resources preceding the associated data channel.

In a seventh aspect there is provided computer readable medium comprising program instructions for causing an apparatus to perform at least the following:
providing first control information using a first control channel and at least second control information using a second control channel, wherein the first control information comprises at least an indication of resource reservation for an associated data channel and the second control information comprises at least transmission format information for the associated data channel, wherein the associated data channel comprises periodic or aperiodic data traffic.

The apparatus may be caused to perform providing the first control information and the second control information using the second control channel.

The first control information may comprise at least one of an indication of data periodicity, data packet information indicating quality of service requirement, resource reservation information and resource allocation information.

The second control information may comprise at least one of modulation and coding scheme (MCS) information, multi-antenna transmission related information and destination address information.

At least one of the first control information and the second control information may comprise at least one of data packet retransmission information and demodulation reference configuration information for the associated data channel.

The apparatus may be caused to perform, when the associated data channel comprises periodic data traffic and there is no data transmission in a current period, providing first control information using the first control channel, wherein the first control information comprises an indication of the absence of data transmission in the current period.

The apparatus may be caused to perform, when the associated data channel comprises periodic data traffic and there is data transmission in a current period, providing the second control channel or the first control channel and the second control channel with the associated data channel.

The apparatus may be caused to perform, when the associated data channel comprises aperiodic data traffic, providing the first control channel in time resources preceding the associated data channel.

In an eighth aspect there is provided a computer readable medium comprising program instructions for causing an apparatus to perform at least the following:
receiving first control information using a first control channel and at least second control information using a second control channel, wherein the first control information comprises at least an indication of resource reservation for an associated data channel and the second control information comprises at least transmission format information for the associated data channel, wherein the associated data channel comprises periodic or aperiodic data traffic.

The apparatus may be caused to perform receiving the first control information and the second control information using the second control channel.

The first control information may comprise at least one of an indication of data periodicity, data packet information indicating quality of service requirement, resource reservation information and resource allocation information.

The second control information comprises at least one of modulation and coding scheme (MCS) information, multi-antenna transmission related information and destination address information.

At least one of the first control information and the second control information may comprise at least one of data packet retransmission information and demodulation reference configuration information for the associated data channel.

The apparatus may be caused to perform, when the associated data channel comprises periodic data traffic and there is no data transmission in a current period, receiving first control information using the first channel, wherein the first control information comprises an indication of the absence of data transmission in the current period.

The apparatus may be caused to perform, when the associated data channel comprises periodic data traffic and there is data transmission in a current period, receiving the second control channel or the first control channel and the second control channel with the associated data channel.

The apparatus may be caused to perform, when the associated data channel comprises aperiodic data traffic, receiving the first control channel in time resources preceding the associated data channel.

In a ninth aspect there is provided a non-transitory computer readable medium comprising program instructions for causing an apparatus to perform at least the method according to the third aspect or a method according to the fourth aspect.

In the above, many different example embodiments have been described. It should be appreciated that further example embodiments may be provided by the combination of any two or more of the example embodiments described above.

DESCRIPTION OF FIGURES

Embodiments will now be described, by way of example only, with reference to the accompanying Figures in which:

FIG. 5 shows a flowchart of a method according to an example;

FIG. 6 shows a flowchart of a method according to an example;

DETAILED DESCRIPTION

Before explaining in detail the example embodiments, certain general principles of a wireless communication system and mobile communication devices are briefly explained with reference to FIGS. 1 to 3 to assist in understanding the technology underlying the described examples.

Figure 1:
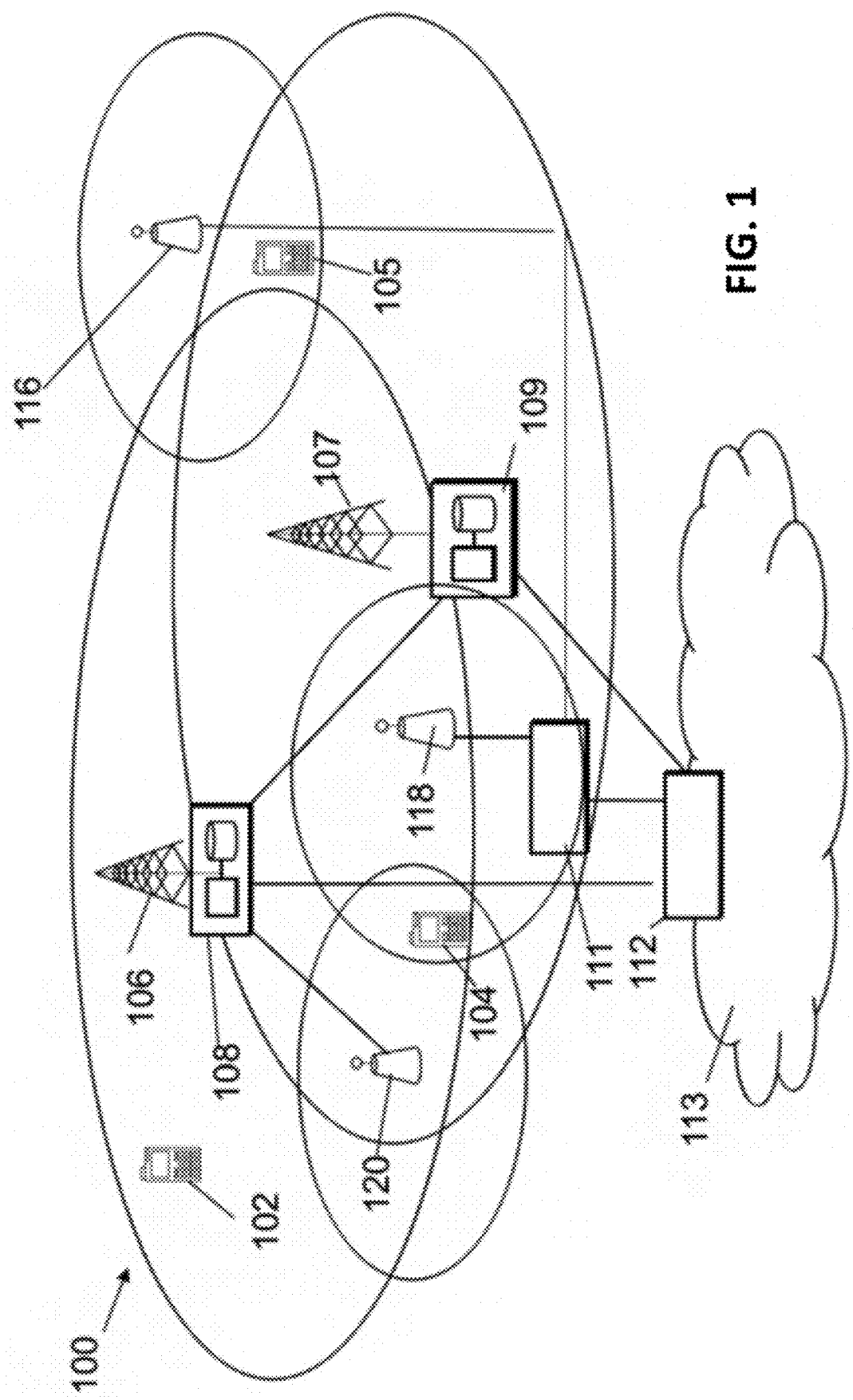
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some example embodiments, the smaller stations may not be provided. Smaller base stations 116, 118 and 120 may be part of a second network, for example WLAN and may be WLAN Aps.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User- Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

An example embodiment 5G core network (CN) comprises functional entities. The CN is connected to a UE via the radio access network (RAN). An UPF (User Plane Function) whose role is called PSA (PDU Session Anchor) may be responsible for forwarding frames back and forth between the DN (data network) and the tunnels established over the 5G towards the UE(s) exchanging traffic with the DN.

The UPF is controlled by an SMF (Session Management Function) that receives policies from a PCF (Policy Control Function). The CN may also include an AMF (Access & Mobility Function).

Figure 2:
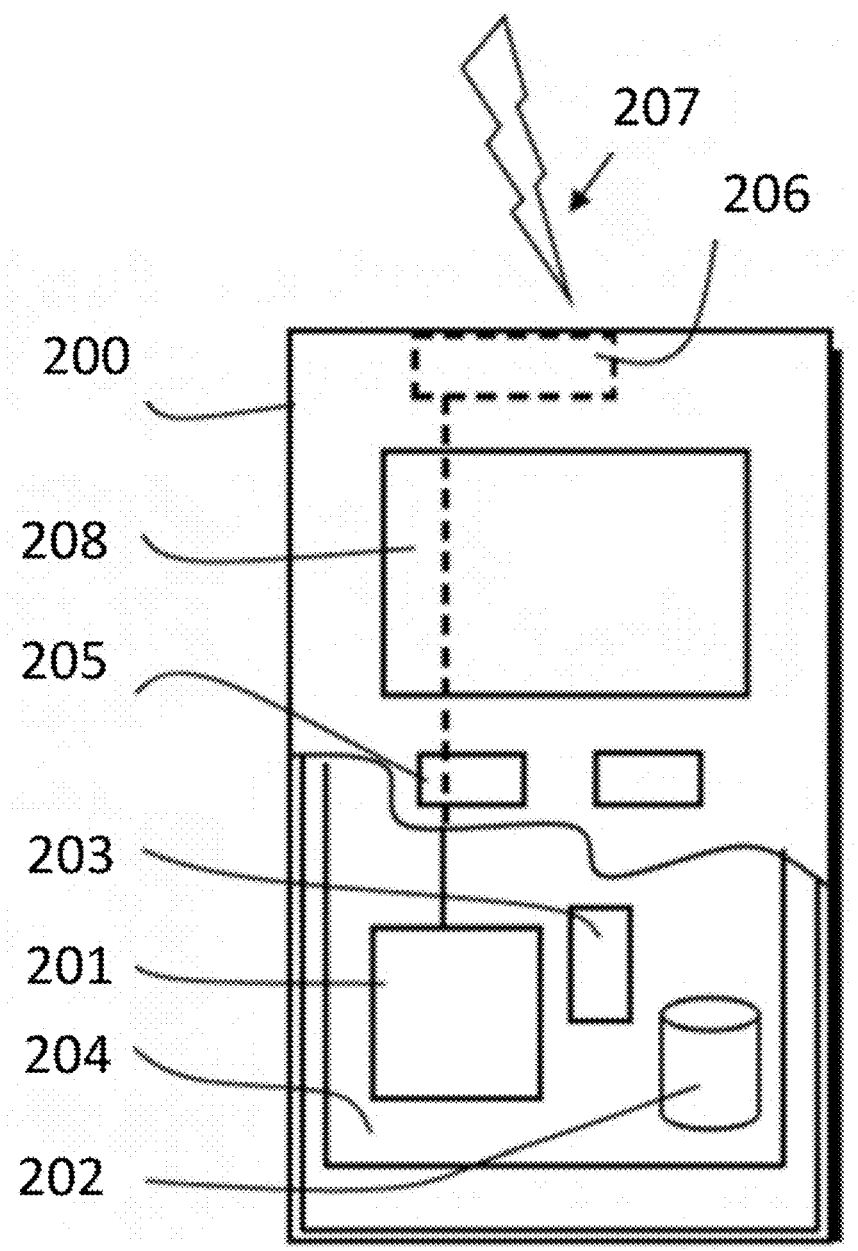
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
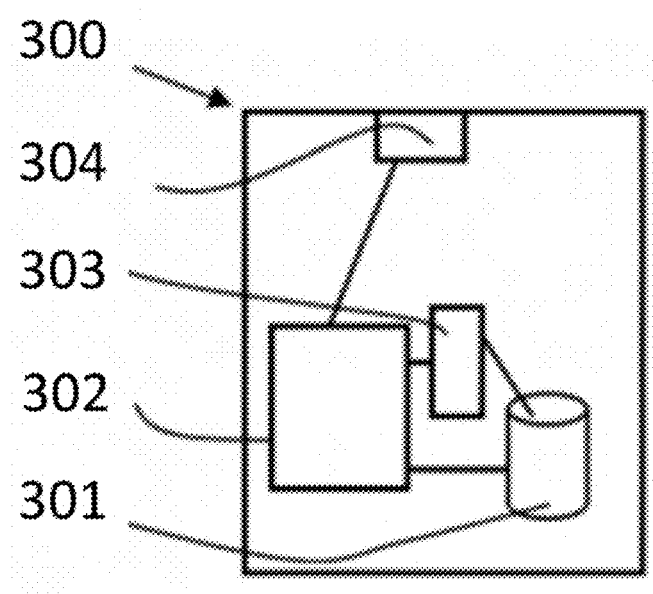
FIG. 3 shows a schematic diagram of an example control apparatus.

FIG. 3 shows an example of a control apparatus for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some example embodiments, base stations comprise a separate control apparatus unit or module. In other example embodiments, the control apparatus can be another network element such as a radio network controller or a spectrum controller. In some example embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

LTE V2X sidelink has been defined in LTE Release 14 to support direct communication of basic road safety services (e.g. vehicle status information such as position, speed and heading etc.) between vehicle and vehicle/pedestrian/infrastructure. In LTE Release 15, V2X sidelink was further enhanced with the features of carrier aggregation, higher order modulation and latency reduction to support more diversified services and more stringent service requirements.

Figure 4:
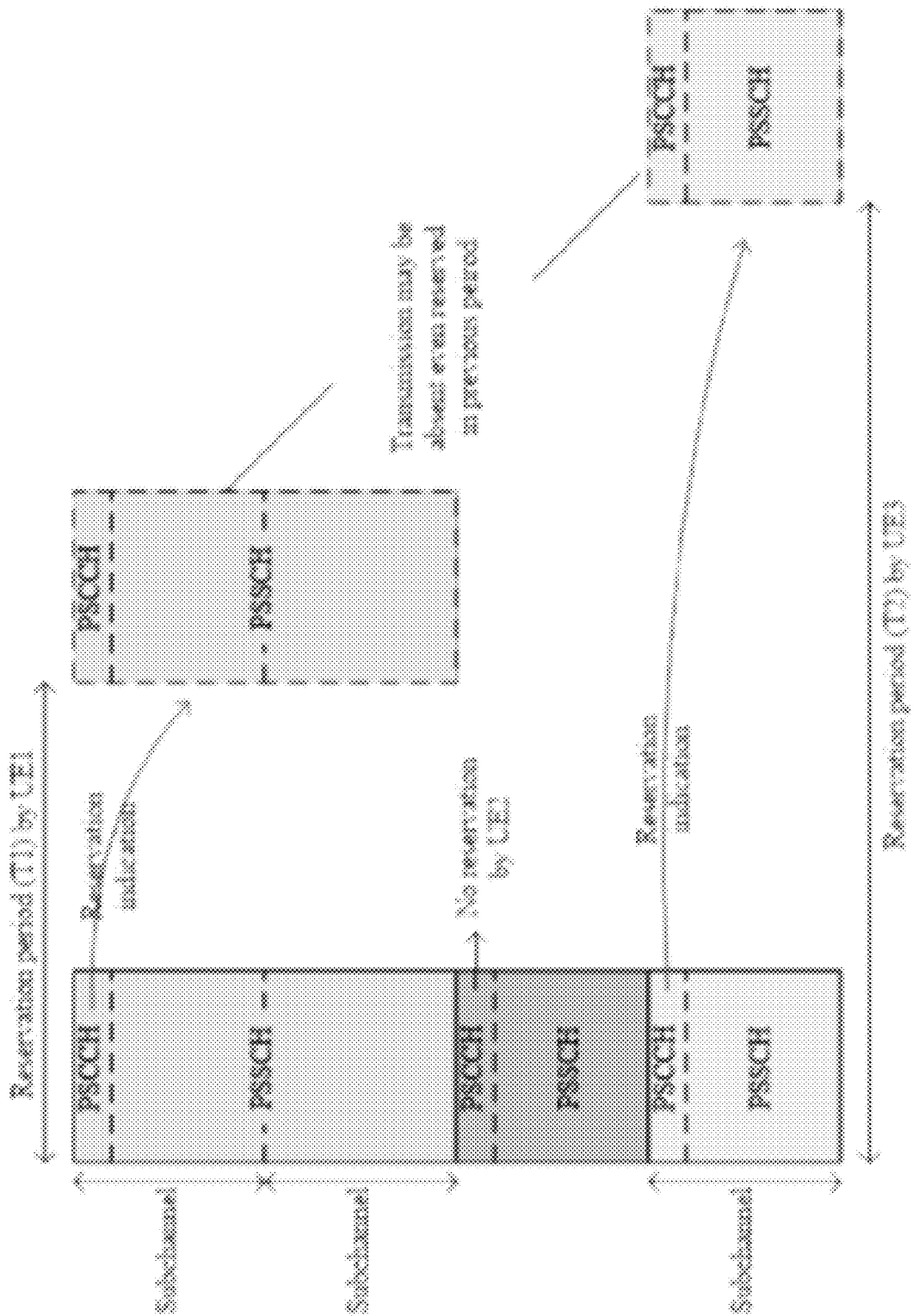
FIG. 4 shows a schematic diagram of a channel structure.

In LTE V2X Release 14/15, the involved physical channels include physical sidelink control channel (PSCCH) and physical sidelink shared channel (PSSCH) for control message and data traffic, respectively. In LTE V2X design, PSCCH and the associated PSSCH are transmitted over the same time resources using non-overlapping (adjacent or non-adjacent) frequency resources, as shown in FIG. 4. The control channel of PSCCH conveys at least the information necessary to decode the associated PSSCH. PSCCH may indicate the resource reservation for the next period which facilitates efficient resource allocation for periodic V2X traffic. However, even in the case of resource reservation, V2X transmissions in the next period may be absent e.g. due to congestion control by channel occupation ratio (CR)/ channel busy ratio (CBR) measurements.

In LTE V2X Release 14/15, sensing based resource (re) selection and reservation are applied in V2X sidelink mode 4 (i.e. UE autonomous resource selection mode) to avoid resource selection collisions as much as possible.

Once a UE has a packet to transmit and MAC instructs PHY layer to make candidate resource selection to report to MAC for resource selection, the UE performs the candidate resource subset selection procedure based on the channel sensing results, where the sensing UE decodes the PSCCH of the sensed Ues to acquire information such as packet priority, resource reservation information and control CRC bits (to determine DMRS of associated PSSCH). The sensing UE performs the measurement of PSSCH reference single received power (RSRP) to determine whether to exclude the candidate resource. The UE ranks the remaining resources based on the energy measurement (sidelink received signal strength indicator (S-RSSI)) and reports the candidate resources with least energy measurement.

The existing LTE V2X design of control/data channel structure and semi-persistent transmission (SPT) with channel sensing and reservation mechanism is tailored to periodic V2X traffic. However, in NR V2X, there may be more diverse V2X traffic types including both periodic V2X traffic and aperiodic V2X traffic.

For spectrum efficiency, periodic and aperiodic V2X traffic types may coexist in the same resource pool. The LTE V2X design of control/data channel structure and SPT mechanism may not work well for aperiodic V2X traffic because of the unpredictable interference due to the aperiodic nature.

The following aims to provide a new physical channel structure and mechanisms. In particular, unified sidelink physical channel structure and mechanisms may flexibly support aperiodic V2X traffic and periodic V2X traffic is provided.

FIG. 5 shows a method which may be used to provide a unified sidelink physical channel structure.

In a first step, S1, the method comprises providing first control information using a first control channel, wherein the first control information comprises at least an indication of resource reservation for an associated data channel.

In a second step, S2, the method comprises providing at least second control information using a second control channel, wherein the second control information comprises at least transmission format information for the associated data channel.

The associated data channel comprises periodic or aperiodic data traffic.

The method may be performed by user equipment.

FIG. 6 shows a method which may be used to provide a unified sidelink physical channel structure. The method maybe performed by a user equipment or a network entity.

In a first step, T1, the method comprises receiving first control information using a first control channel, wherein the first control information comprises at least an indication of resource reservations for an associated data channel wherein In a second step, T2, the method comprises receiving at least second control information using a second control channel, wherein the second control information comprises at least transmission format information for the associated data channel.

The associated data channel comprises periodic or aperiodic data traffic.

A method as described with reference to FIGS. 5 and 6 may provide a unified sidelink physical control channel design to assist efficient physical data channel operations for scheduling assignment and resource allocation for periodic traffic and aperiodic traffic types.

The first and second control information may comprise sidelink control information.

In the method as described with reference to FIGS. 5 and 6, sidelink control information (SCI) is divided into two parts, first control information and second control information (termed SCI-1 and SCI-2 respectively).

The first control information and the second control information are conveyed (provided) using a first control channel (PSCCH format 1) and a second control channel (PSCCH format 2), respectively. The first control channel and the second control channel may be denoted by PSCCH-1 and PSCCH-2. This sidelink physical control channel design may assist data decoding and resource allocation of associated physical sidelink shared channel (PSSCH) for both periodic traffic and aperiodic traffic.

The channel PSCCH-1 may be used for resource allocation and/or reservation for the data-carrying PSSCH, i.e. an indication of resource reservation for an associated data channel.

For periodic traffic, PSCCH-1 indicates resource allocation for the associated PSSCH in the current period and/or the resource reservation for the next period.

For aperiodic traffic, PSCCH-1 indicates the resource allocation for its associated PSSCH.

The channel PSCCH-2 may be used to assist data decoding for the associated PSSCH including the possible retransmissions, i.e. comprise transmission format information for the associated data channel. The PSCCH-2 may be multiplexed with associated PSSCH in FDM (similarly to PSCCH/PSSCH in LTE R14/15) or in (intra-TTI) TDM (similarly to NR-PDCCH/PDSCH in NR R15).

SCI is exclusively divided into SCI-1 and SCI-2. That is, SCI-1 and SCI-2 comprise different sidelink control information. SCI-1 is carried by the first control channel, while the second control channel can convey SCI-2 only, or convey both SCI-1 and SCI-2. That is, the method may comprise providing the first control information and the second control information using the second control channel. In this case, the second control channel conveys all the relevant sidelink control information.

When the second control channel comprises SCI-2 only, the receiver decodes both PSCCH-1 and PSCCH-2 before it decodes PSSCH for the data packet.

In the case where the second control channel conveys both SCI-1 and SCI-2, the receiver may decode PSSCH for the data packet if it first decodes at least PSCCH-2.

At least one of the first control information and the second control information may comprise at least one of data packet retransmission information and demodulation reference configuration information for the associated data channel.

In an example embodiment, PSCCH-1 comprises the carried SCI-1 and DMRS. The PSCCH-1 may convey information explicitly (e.g. the information included in SCI-1) or implicitly (e.g. the information indicated through different DMRS sequences) depending on the specific design of the PSCCH-1 channel.

PSCCH-1 may convey SCI-1 for indication of resource allocation/reservation information.

The first control information comprises at least one of an indication of data periodicity, data packet information indicating quality of service requirement, resource reservation information and resource allocation information.

That is, SCI-1 may include sidelink control information elements such as packet QoS-relevant information including one or more of priority, latency requirement, and reliability requirement. For example packet QoS-relevant information may comprise packet priority with 3 bits, indicating the priority level of the associated data packet.

SCI-1 may comprise an indication of periodicity, e.g. 1 bit with 0 indicating periodic traffic and 1 indicating one-shot aperiodic traffic.

SCI-1 may comprise an indication of resource allocation information e.g. 7 bits, indicating the resource allocation in frequency e.g. the number of allocated sub-channels.

PSCCH-1 may carry information indicating the presence of associated data for periodic traffic. This may indicate that the associated data will be absent in a current period but that the UE wishes to maintain the periodic resource reservation in next period. PSCCH-1 may carry at least one of a part or type of destination address e.g. 2 bits, indicating part or type of destination address to enable the receivers to decide whether to proceed to decode the associated data to reduce receiving complexity for un-targeted receivers.

PSCCH-1 may comprise information on DMRS for PSCCH-2. E.g. implicitly conveyed by the DMRS information used by PSCCH-1.

PSCCH-2 may convey SCI-2 for indication of transmission format of associated PSSCH.

The second control information comprises at least one of modulation and coding scheme (MCS) information, multi-antenna transmission related information and destination address information.

SCI-2 may include modulation and coding scheme information (MCS) e.g. 5 bits, indicating the MCS index used for the associated PSSCH data packet.

SCI-2 may comprise retransmission information, e.g., retransmission index and time/frequency resource.

PSCCH-2 may carry MIMO-related information, indicating the multi-antenna transmission related information e.g. number of layers.

PSCCH-2 may carry at least part of destination address e.g. 8 bits, to support unicast/groupcast/broadcast.

PSCCH-2 may comprise DMRS information for associated PSSCH. This information may be carried implicitly or explicitly.

The method may comprise, when the associated data channel comprises periodic data traffic and there is no data transmission in a current period, providing first control information using the first control channel, wherein the first control information comprises an indication of the absence of data transmission in the current period. That is, for PSSCH with periodic traffic type, if a resource reservation has been made in a previous period but there is no data transmission in the current period (e.g. due to congestion control), the UE may only transmit PSCCH-1, indicating the absence of associated data in this period and reserve resource in next period.

The method may comprise, when the associated data channel comprises periodic data traffic and there is data transmission in a current period, providing the second control channel or the first control channel and the second control channel with the associated data channel. That is, if a resource reservation has been made in previous period and there is data transmission in the current period, a UE transmits PSCCH-1, PSCCH-2 and PSSCH or PSCCH-2 and PSSCH (where the first control information and the second control information are transmitted using the second channel). PSCCH-1 may multiplex in FDM with associated PSSCH and PSCCH-2 may multiplex in FDM and/or (intra-TTI) TDM with associated PSSCH.

Figure 7:
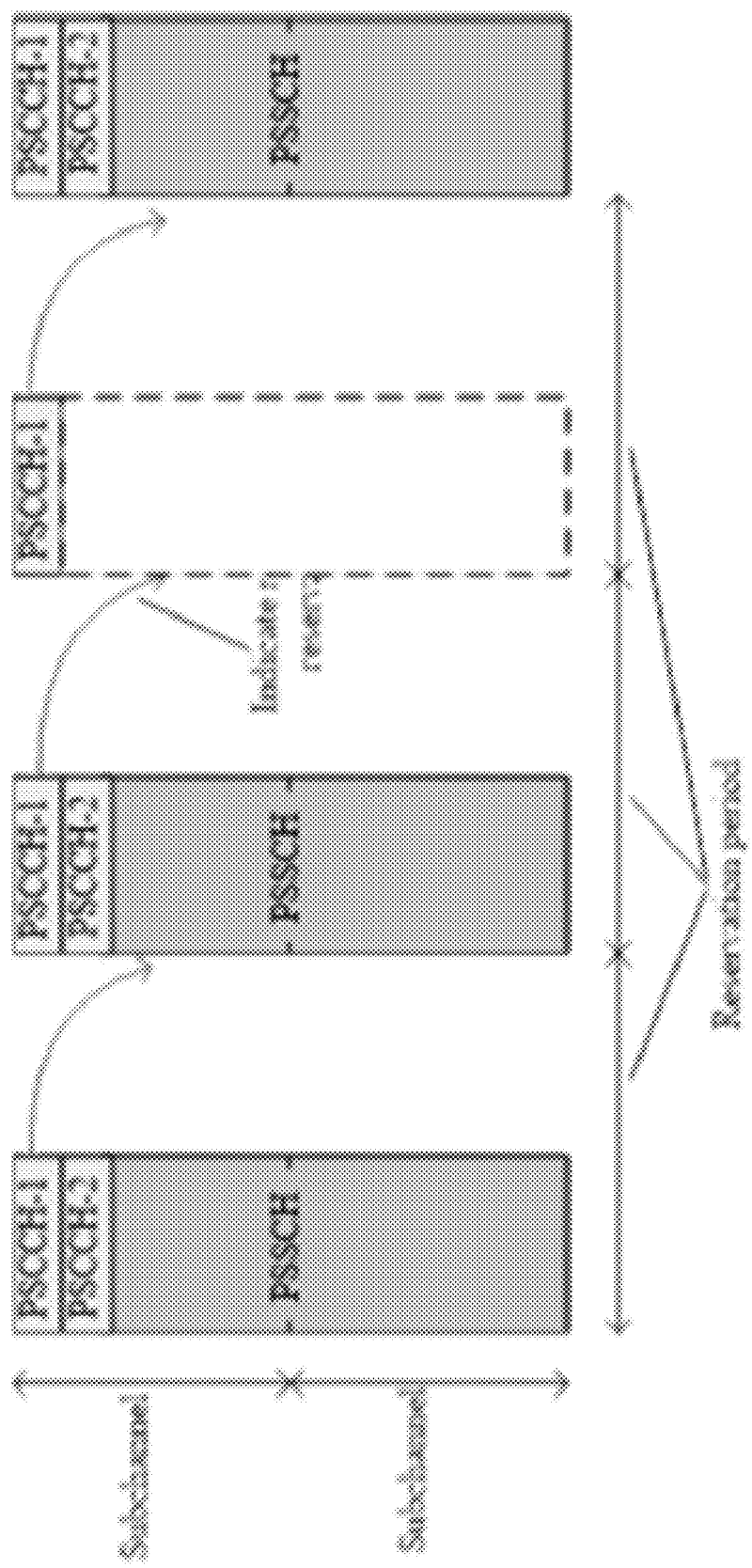
FIG. 7 shows a schematic diagram of a channel structure according to an example.
Figure 8:
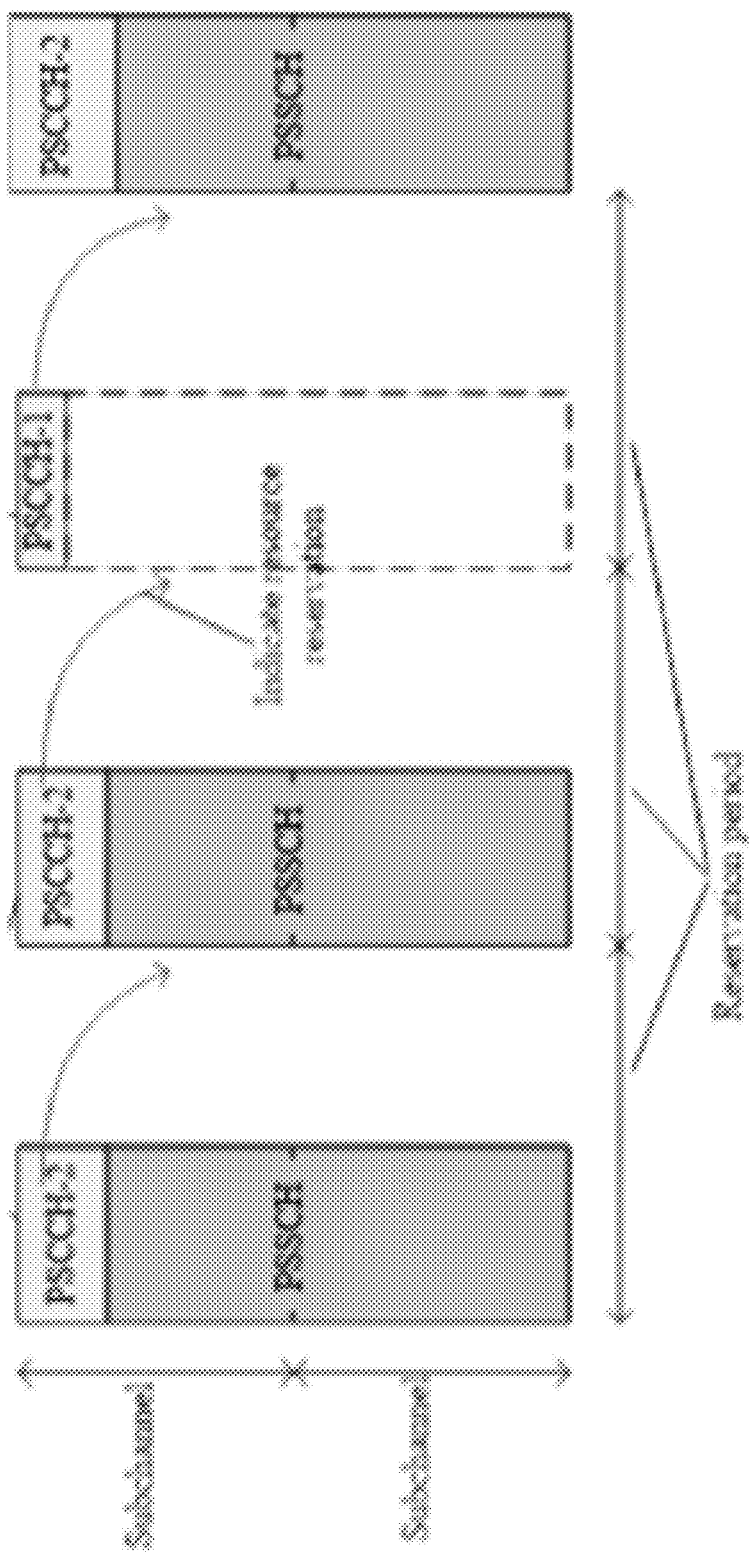
FIG. 8 shows a schematic diagram of a channel structure according to an example.

FIG. 7 and FIG. 8 illustrate examples of the proposed control channel structure for periodic V2X traffic.

In the example shown in FIGS. 7 and 8, PSCCH-1 indicates that the data packet type is periodic, which determines the interpretation of the information field of resource reservation in time as specified in Table 1.

In the example shown in FIG. 7, the SCI information is exclusively divided into SCI-1 and SCI-2 (i.e. they have different control information). PSCCH-1 indicates periodic traffic, resource reservation period and the presence or absence of associated PSCCH-2/PSSCH in the current TTI.

In the example shown in FIG. 8, PSCCH-2 conveys SCI-1 as well as SCI-2. That is, PSCCH-2 conveys all the sidelink control information including at least the resource reservation information and transmission format information. PSCCH-1 indicates periodic traffic, resource reservation period and the absence of associated PSCCH-2/PSSCH in the current TTI.

Even for periodic traffic, the UE may abandon the packet transmission in some specific period e.g. due to reasons of congestion control based on measurements of CR/CBR. In this case, the UE transmits PSCCH-1 to indicate the resource reservation for next period. This may be beneficial for channel sensing and resource selection of other UEs in that those UEs could be aware of the resource reservation, instead of relying on the long-term energy measurement of S-RSSI over the periodic resources to exclude that resource. Since PSCCH-1 only occupies limited resource (e.g. one PRB over one slot), the interference it brings to the sidelink transmissions (if any) may be limited.

The method may comprise, when the associated data channel comprises aperiodic data traffic, providing the first control channel in time resources preceding the associated data channel.

That is, for PSSCH with aperiodic traffic type, a UE transmits PSCCH-1, PSCCH-2 and associated PSSCH, where PSCCH-1 precedes PSCCH-2 and PSSCH in the time domain and PSCCH-2 could multiplex in FDM and/or (intra-TTI) TDM with associated PSSCH.

PSCCH-1 indicates the resource allocation of the associated PSSCH. With PSCCH-1 transmitted before the associated data which is conveyed by PSSCH, the UE which has higher priority data to transmit may use the PSCCH-1 to preempt the low priority data transmissions of other UEs and trigger them to make resource reselections or abandon their transmission.

Figure 9:
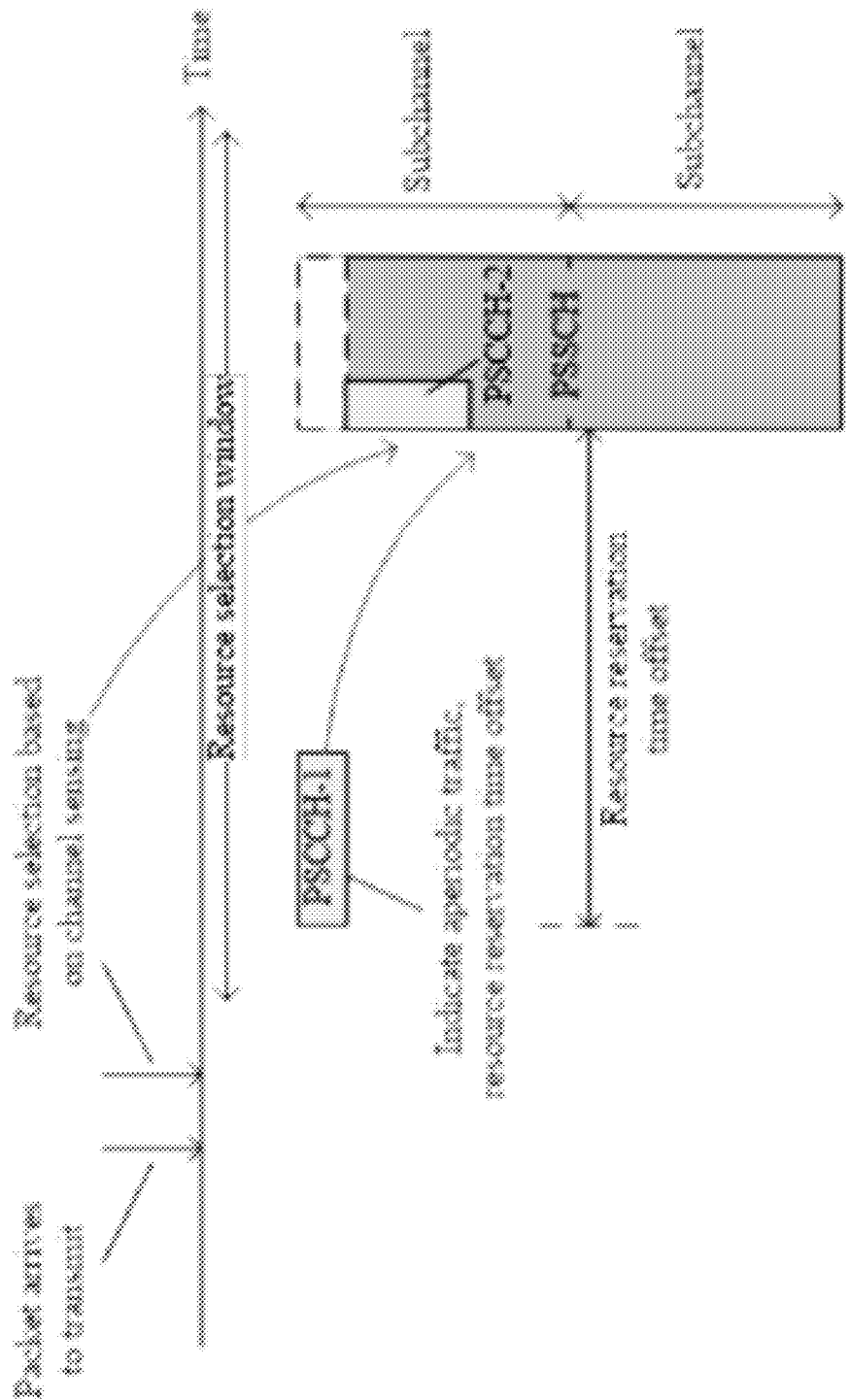
FIG. 9 shows a schematic diagram of a channel structure according to an example.
Figure 10:
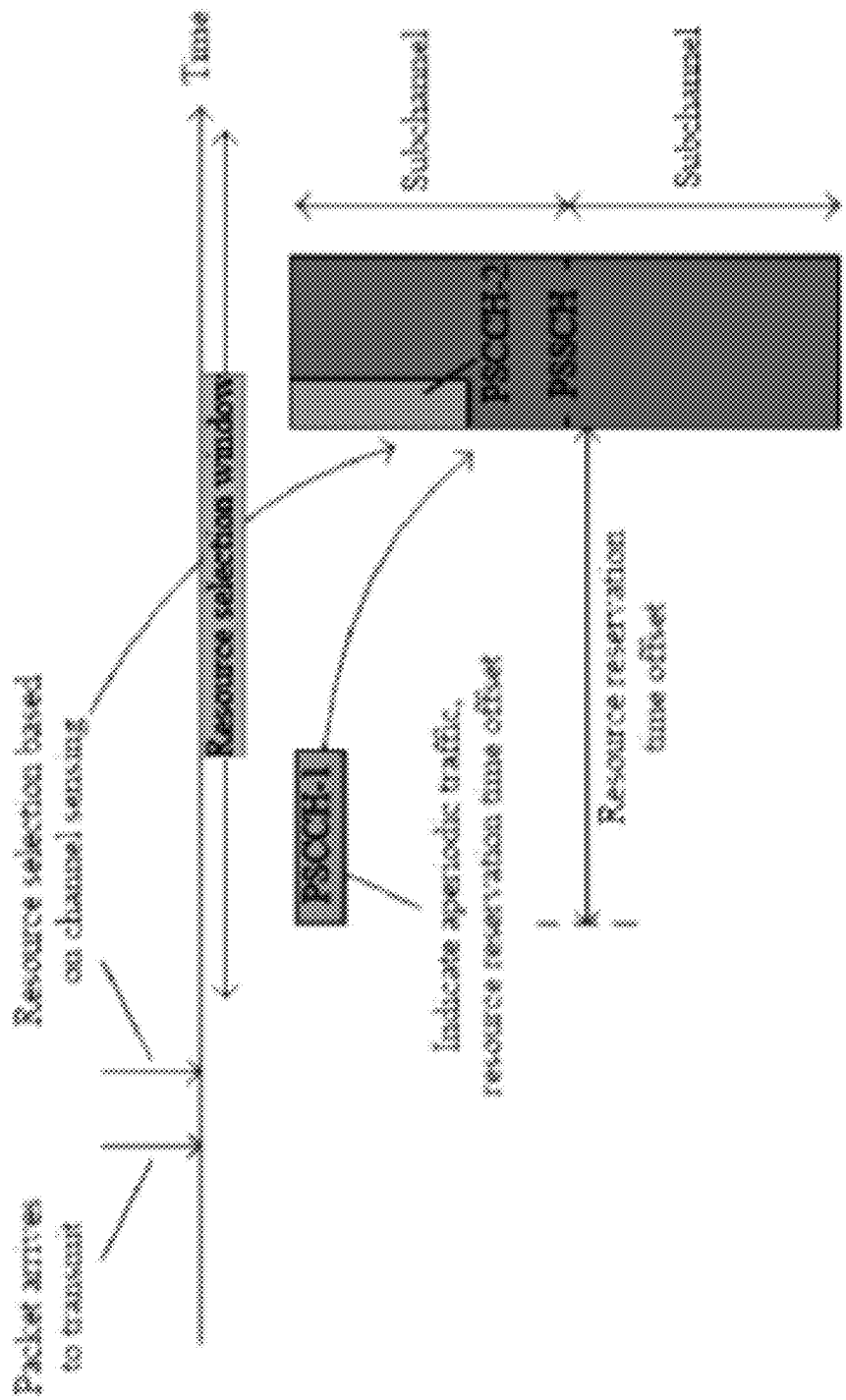
FIG. 10 shows a schematic diagram of a channel structure according to an example.

FIG. 9 and FIG. 10 illustrate an example of the proposed control channel structure used for aperiodic V2X traffic. When an aperiodic packet (e.g. an event-driven one-shot transmission packet) arrives from higher layer to MAC/PHY layers to be transmitted, based on the available channel sensing results and the latency requirement for the packet, the UE selects sidelink resource(s) for transmission of the packet (i.e. the packet denoted by the grey rectangle). In order to prevent other UEs (with periodic or aperiodic traffic) from using this resource, the UE will transmit PSCCH-1 ahead of the selected resource to indicate the resource reservation. Note that PSCCH-1 also carries the packet QoS-relevant information, which may be taken into account by other UEs in their resource selection/pre-emption related operations.

The PSCCH-1 indicates that the packet type of aperiodic traffic which will determine the interpretation of the information field of resource reservation in time as specified in Table 1.

In FIG. 9, the SCI information is exclusively distributed to SCI-1 and SCI-2 (i.e. they contain different control information) carried by PSCCH-1 and PSCCH-2 respectively. In this case, the resource corresponding to PSCCH-1 position in the TTI of PSSCH could be kept unused as shown in the figure. This may facilitate other PSCCH-1 transmissions from other UEs.

In FIG. 10, PSCCH-2 conveys SCI-1 as well as SCI-2. That is, PSCCH-2 conveys all the sidelink control information including at least the resource reservation information and transmission format information. The benefit of this configuration is that the receivers could still decode the PSSCH based on PSCCH-2 even if they miss the transmission of PSCCH-1. An example of the configuration of the resource reservation in time is shown in Table 1. Note that TU denotes time unit e.g. slot, TTI or subframe.

TABLE 1

| Resource reservation in time (4 bits) | Reservation period for periodic traffic | Time offset between PSCCH-1 and PSSCH for one-shot aperiodic traffic |
|---|---|---|
| 0000 | No reservation | 0 (i.e. same TTI for PSCCH-1/PSCCH-2/PSSCH) |
| 0001 | 10 ms | 1 TU |
| 0010 | 20 ms | 2 TUs |
| 0011 | 50 ms | 3 TUs |
| 0100 | 100 ms | 4 TUs |
| 0101 | 200 ms | 5 TUs |
| 0110 | 300 ms | 6 TUs |
| 0111 | 400 ms | 7 TUs |
| 1000 | 500 ms | 8 TUs |
| 1001 | 600 ms | 9 TUs |
| 1010 | 700 ms | 10 TUs |
| 1011 | 800 ms | 11 TUs |
| 1100 | 900 ms | 12 TUs |
| 1101 | 1000 ms | 13 TUs |
| 1110 | Reserved | 14 TUs |
| 1111 | Reserved | 15 TUs |

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst the example embodiments have been described in relation to, similar principles can be applied in relation to other networks and communication systems where periodic and aperiodic data transmissions are supported. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The example embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out example embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further example embodiment comprising a combination of one or more example embodiments with any of the other example embodiments previously discussed.

What is claimed is:

1. A user equipment comprising:
   at least one processor; and
   at least one memory storing instructions thereon that, when executed by the at least one processor, cause the user equipment to perform at least:
   providing first control information using a first control channel of a unified physical sidelink channel structure and at least second control information using a second control channel of the unified physical sidelink channel structure,
   wherein the first control information comprises at least an indication of resource allocation for an associated data channel of the unified physical sidelink channel structure,
   wherein the second control information comprises at least transmission format information for assisting data decoding of the associated data channel, and
   wherein the associated data channel comprises periodic or aperiodic data traffic.

2. The user equipment according to claim 1, wherein the second control information comprises destination address information.

3. The user equipment according to claim 2, wherein the destination address information is at least part of a destination address to support unicast or groupcast or broadcast transmissions.

4. The user equipment according to claim 1, wherein the second control information comprises data packet retransmission information for the associated data channel.

5. The user equipment according to claim 1, wherein the first control information comprises data packet information indicating a quality of service requirement.

6. The user equipment according to claim 5, wherein the data packet information indicating a quality of service requirement indicates data packet priority.

7. The user equipment according to claim 1, wherein the first control information comprises resource reservation information.

8. A user equipment comprising:
   at least one processor; and
   at least one memory storing instructions thereon that, when executed by the at least one processor, cause the user equipment to perform at least:
   receiving first control information using a first control channel of a unified physical sidelink channel structure and at least second control information using a second control channel of the unified physical sidelink channel structure,
   wherein the first control information comprises at least an indication of resource allocation for an associated data channel of the unified physical sidelink channel structure,
   wherein the second control information comprises at least transmission format information for assisting data decoding of the associated data channel, and
   wherein the associated data channel comprises periodic or aperiodic data traffic.

9. The user equipment according to claim 8, wherein the second control information comprises destination address information.

10. The user equipment according to claim 9, wherein the destination address information is at least part of a destination address to support unicast or groupcast or broadcast transmissions.

11. The user equipment according to claim 8, wherein the second control information comprises data packet retransmission information for the associated data channel.

12. The user equipment according to claim 8, wherein the first control information comprises data packet information indicating a quality of service requirement.

13. The user equipment according to claim 12, wherein the data packet information indicating a quality of service requirement indicates data packet priority.

14. The user equipment according to claim 8, wherein the first control information comprises resource reservation information.

15. A method comprising:
   providing first control information using a first control channel of a unified physical sidelink channel structure and at least second control information using a second control channel of the unified physical sidelink channel structure, wherein the first control information comprises at least an indication of resource allocation for an associated data channel of the unified physical sidelink channel structure,
   wherein the second control information comprises at least transmission format information for assisting data decoding of the associated data channel, and
   wherein the associated data channel comprises periodic or aperiodic data traffic.

16. The method according to claim 15, wherein the second control information comprises destination address information that is at least part of a destination address to support unicast or groupcast or broadcast transmissions.

17. The method according to claim 15, wherein the second control information comprises data packet retransmission information for the associated data channel.

18. The method according to claim 15, wherein the first control information comprises data packet information indicating a quality of service requirement or resource reservation information.

19. The method according to claim 18, wherein the data packet information indicating a quality of service requirement indicates data packet priority.

20. A method comprising:
   receiving first control information using a first control channel of a unified physical sidelink channel structure and at least second control information using a second control channel of the unified physical sidelink channel structure,
   wherein the first control information comprises at least an indication or resource allocation for an associated data channel of the unified physical sidelink channel structure, wherein the second control information comprises at least transmission format information for assisting data decoding of the associated data channel, and wherein the associated data channel comprises periodic or aperiodic data traffic.

21. The method according to claim 20, wherein the second control information comprises destination address information that is at least part of a destination address to support unicast or groupcast or broadcast transmissions.

22. The method according to claim 20, wherein the second control information comprises data packet retransmission information for the associated data channel.

23. The method according to claim 20, wherein the first control information comprises data packet information indicating a quality of service requirement or resource reservation information.

24. The method according to claim 23, wherein the data packet information indicating a quality of service requirement indicates data packet priority.

25. A non-transitory computer-readable storage medium comprising program instructions that, when executed by a processor, cause a user equipment to perform at least the following:

providing first control information using a first control channel of a unified physical sidelink channel structure and at least second control information using a second control channel of the unified physical sidelink channel structure, wherein the first control information comprises at least an indication of resource allocation for an associated data channel of the unified physical sidelink channel structure, wherein the second control information comprises at least transmission format information for assisting data decoding of the associated data channel, and wherein the associated data channel comprises periodic or aperiodic data traffic.

26. A non-transitory computer-readable storage medium comprising program instructions that, when executed by a processor, cause a user equipment to perform at least the following:

receiving first control information using a first control channel of a unified physical sidelink channel structure and at least second control information using a second control channel of the unified physical sidelink channel structure, wherein the first control information comprises at least an indication of resource allocation for an associated data channel of the unified physical sidelink channel structure, wherein the second control information comprises at least transmission format information for assisting data decoding of the associated data channel, and wherein the associated data channel comprises periodic or aperiodic data traffic.

* * * * *